United States Patent [19]
Beth

[11] Patent Number: 4,651,765
[45] Date of Patent: Mar. 24, 1987

[54] FERTILIZER PUMP

[75] Inventor: Frank Beth, Korazim, Israel

[73] Assignee: Amiad Sinun VeHashkaya, Korazim, Israel

[21] Appl. No.: 761,593

[22] Filed: Aug. 1, 1985

[51] Int. Cl.⁴ .................................... G05D 11/00
[52] U.S. Cl. .................................... 137/99; 137/564.5
[58] Field of Search .................... 137/99, 564.5, 88

[56] References Cited
U.S. PATENT DOCUMENTS

| | | | |
|---|---|---|---|
| 1,720,326 | 7/1929 | Halstead et al. | 137/99 |
| 2,206,089 | 7/1940 | Gray | 137/564.5 |
| 2,696,266 | 12/1954 | Tuve | 137/99 X |
| 3,053,842 | 9/1962 | Meissner | 137/99 X |
| 3,570,508 | 3/1971 | Boggs et al. | 137/99 X |
| 3,575,535 | 4/1971 | Bickar | 137/99 X |
| 4,250,908 | 2/1981 | Velie | 137/88 X |

Primary Examiner—Alan Cohan
Assistant Examiner—John A. Rivell
Attorney, Agent, or Firm—Benjamin J. Barish

[57] ABSTRACT

A pump for injecting fertilizer or other material into a pressurized water supply line comprises an impeller including a housing having an inlet connectable to the pressurized water supply line, an outlet vented to the atmosphere, and impeller vanes rotatably mounted within the housing to be rotated by the pressurized water flowing therethrough from its inlet to its outlet. The pump further includes an injector coupled to the impeller to inject the material into the water supply line at a point downstream of the impeller.

20 Claims, 2 Drawing Figures

FERTILIZER PUMP

BACKGROUND OF THE INVENTION

The present invention relates to pumps, and particularly to pumps for injecting fertilizer or other material into a pressurized water supply line.

Water irrigation systems commonly include pumps for introducing fertilizers, herbicides, and other materials into the irrigating water such that the irrigating water acts both as a conveyor and as a distributor of these materials. This eliminates the need for separately spreading solid or liquid fertilizers or other chemicals over the ground, as well as the possible damage to the soil (by compression) or to the crops that may result from such separate spreading. In addition, distributing these materials via the irrigating water also eliminates the need to purchase, maintain and operate separate equipment for this purpose, and better insures uniformity of distribution of the materials.

A number of devices are known for injecting fertilizers or other materials into the pressurized water supply lines, but the known devices are not entirely satisfactory. One known device includes an arrangement for introducing the materials into the water supply line on the suction side of the pressurizing pump, but such known arrangements are generally cumbersome, difficult to control accurately, and may cause chemical damage to the main pump. Another known arrangement includes a Venturi-type device, but in such arrangement, the injection rate is difficult to control and maintain. A further known arrangement is by the use of by-pass pressure displacement tanks, but such arrangements are also difficult to control and to maintain the injection rate, and also the metal tanks tend to corrode in a chemical environment. A still further known arrangement includes an injector powered by an auxiliary motor, but such devices require a power source energized by fuel or electricity, which is not always available in remote locations of the water supply line; in addition, corrosion is another problem in such arrangements, particularly if the injector is powered by an electric motor.

Also known are hydraulic-powered injectors deriving the energy from the pressurized water in the water supply line; however, the known devices of this type are usually of very complicated construction, which is costly to manufacture and to maintain.

A further known pump, as described in U.S. Pat. No. 3,570,508, includes a propeller immersed in the water of the supply line so as to utilize the energy of the pressurized water for driving the pump. The present invention is directed to the latter type of pump but provides a number of important advantages as will be described more particularly below.

An object of the present invention is to provide a pump, and particularly one of the latter type powered by the pressurized water of the supply line, but of relatively simple construction which can be manufactured and maintained at relatively low cost.

SUMMARY OF THE INVENTION

According to a broad aspect of the present invention, there is provided a pump for injecting fertilizer or other material into a pressurized water supply line, comprising: an impeller including a housing having an inlet connectable to the pressurized water supply line, an outlet vented to the atmosphere, and impeller vanes rotatably mounted within the housing to be rotated by the pressurized water flowing therethrough from its inlet to its outlet; and an injector including an inlet connectable to a source of the material to be injected, an outlet connectable to the water supply line at a point downstream of the impeller, and a coupling to the impeller vanes coupling them to the injector to inject the material into the water supply line at the downstream point at a greater pressure than that of the water thereat.

A pumping device constructed in accordance with the foregoing features provides a number of important advantages over the pumping device described in the above-referenced U.S. Pat. No. 3,570,508. Thus, the pump in that patent is connected in series with the water supply line and is submerged in the water, which requires the pump to be sealed; whereas in the present invention the pump is connected in parallel across the water supply line and is disposed externally of the water supply line, thereby not only simplifying the sealing arrangement considerably, but also simplifying the servicing of the pump for maintenance or repair purposes. Further, the arrangement of the present invention introduces less turbulence and pressure drop in the water flowing through the line. In addition, it enables the convenient control of the rate of injection of the fertilizer into the supply line. Still further, by connecting the outlet of the impeller directly to the atmosphere, a substantial pressure is available for driving the impeller to drive the injector.

Two embodiments of the invention are described below for purposes of example. In one embodiment, the injector comprises a screw feeder rotated by the impller vanes. In a second described embodiment, the injector comprises a second impeller rotated by the impeller vanes of the first-mentioned impeller, but of smaller diameter than those of the first-mentioned impeller. Both embodiments are such that the discharge of the injected material is at a higher pressure, but at a lower rate, than the water drive.

Further features and advantages of the invention will be apparaent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
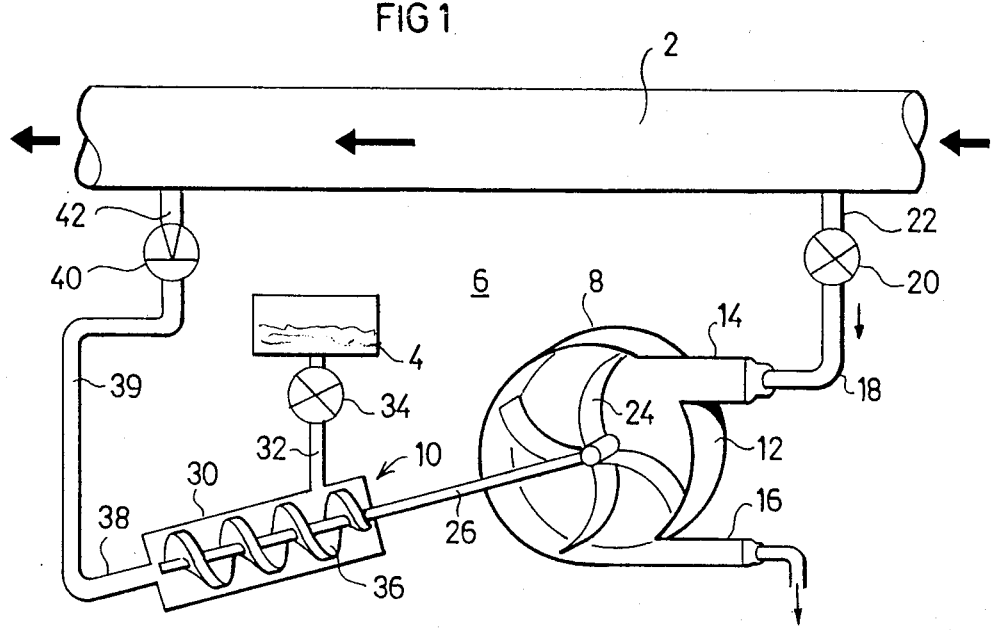
FIG. 1 schematically illustrates one form of pump for injecting fertilizer or other material into a pressurized water supply line in accordance with the present invention.

With respect to FIG. 1, there is illustrated a pressurized water supply line 2 supplying irrigating water, and a source 4 of liquid fertilizer or other material (e.g. herbicide) to be injected into the irrigation water by means of a pump, generally designated 6. Pump 6 includes two sections, namely, a motor section 8 driven by the pressure of the water in the supply line 2, and an injector section 10 driven by motor 8 for feeding the fertilizer or other liquid material from source 4 into the supply line 2 for mixing with the water flowing therethrough.

More particularly, impeller 8 includes a housing 12 having an inlet 14 and an outlet 16. Inlet 14 is connected by a tube 18 and a control valve 20 to a port 22 of the water supply line 2. Outlet 16 of housing 12 is vented to the atmosphere. Disposed within housing 12 is a set of turbine-type impeller vanes 24 rotating an output drive shaft 26 by the pressurized water flowing through the housing from its inlet 14 to its outlet 16, where the water is exhausted to the atmosphere.

Injector 10 also includes a housing 30 having an inlet 32 connected via a control valve 34 to the container 4 for the fertilizer or other liquid material to be injected into the water supply line 2. Injector 10 further includes a spiral-type screw conveyor 36 coupled to the rotary drive shaft 26 for feeding the material from inlet 32 to the injector outlet 38. From there the material is fed via a tube 39 and check valve 40 to a port 42 of the water supply line 2 downstream of the first-mentioned port 22.

It will be seen that the apparatus illustrated in FIG. 1 operates as follows: The pressurized water from the supply line 2 is inletted into impeller housing 12 via inlet 14, and rotates the impeller vanes 24 (counterclockwise in FIG. 1), before being exhausted to the atmosphere via outlet 16. The rotation of the impeller vanes 24 is transmitted via rotary shaft 26 to injector 10, wherein its screw feeder 36 is rotated to feed the fertilizer or other material from the source 4 through the injector housing 30 and to port 42 of the water supply line 2 via tube 39 and check valve 40.

Control valve 20 at the inlet side of the impeller 8 may be used for controlling the rate of water directed to the inlet 14 of impeller 8, and thereby the rate of injection of the fertilizer or other material from source 4 into the supply line. If no such material is to be injected, control valve 20 would be closed.

Control valve 34 at the inlet side of the injector 10 controls the rate of flow of the fertilizer or other material from source 4 into the inlet 32 of the injector, and thereby also controls the rate of injection of such material into the supply line. Check valve 40 is a one-way valve, permitting the injected material to flow from tube 39 into the supply line 2, but does not permit the water from the supply line to flow in the reverse direction to the injector 10 during the times the injector may not be in operation.

Source 4 for the injected material may be an open-top container or a closed-top container, and the injected material may be gravity-fed or suction-fed from the container into the injector housing 30. In either case, it will be seen that since the cross-section of screw 36 is smaller than that of the water-driven impeller vanes 24, the discharge of the injected material from injector 10 will be at a higher pressure than the water drive pressure, and therefore, than the line pressure at the downstream port 42 of the water supply line 2; thus, there will be an excess positive pressure injecting this material into the water flowing through the supply line. It will also be appreciated that the flow of the injected material will be at a lower rate than the flow of water through impeller 8, but this rate can be adjusted by control valves 20 and/or 34 as discussed above.

Figure 2:
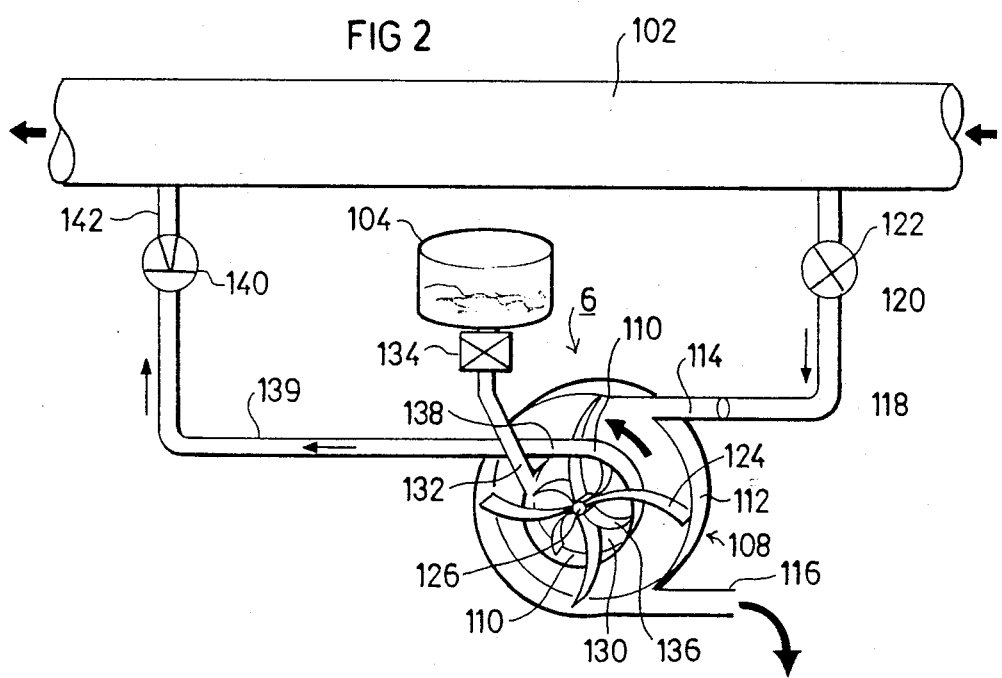
FIG. 2 illustrates another pump for this purpose, also constructed in accordance with the present invention.

FIG. 2 illustrates another arrangement that could be used, in which the pressurized water from the supply line 102 is also used to drive the pump, generally designated 106, for injecting a fertilizer or other chemical supplied from a container 104 into the supply line. The arrangement illustrated in FIG. 2 also includes an impeller 108 of generally the same construction as impeller 8 in FIG. 1 for utilizing the energy of the water in the supply line. However, the injector 110 is of a similar impeller construction as impeller 108, rather than being of spiral-screw feeder construction as in FIG. 1.

Thus, impeller 108 in the FIG. 2 apparatus also includes a housing 112 having an inlet 114, an outlet 116, and turbine-type impeller vanes 124 rotated by the water fed from the water supply line 102 via inlet tube 118, control valve 120, and port 122. The impeller vanes 124 drive a rotary output shaft 126.

Injector 110 is enclosed within a housing 130 in side by side relationship to housing 108, but of smaller diameter than the latter housing. Injector housing 130 also includes a set of turbine-type impeller vanes 136 coupled to the rotary output shaft 126 of impeller 108, the latter vanes 136 being oriented so as to feed the injected material via outlet 138 and tube 139 to the downstream port 142 of the supply line 102 via a check valve 140.

As in the arrangement illustrated in FIG. 1, tank 104 may be an open-top container or a closed-top container, and the injected material could be gravity-fed or suction-fed from the container to the injector.

As also described above with respect to FIG. 1, since impeller vanes 136 of the injector 110 are of smaller diameter than the impeller vanes 124 of the impeller 108, the injected material will be discharged via outlet 138 into port 142 of the supply line at a higher pressure than the water drive pressure, and therefore, at a higher pressure than the pressure of the water supply line 102 at the downstream port 142. In addition, the rate of flow of the injected material will be less than the rate of flow of the water to the impeller inlet 114, but the injected material rate of flow can be controlled by control valve 120 and 134, as in the FIG. 1 embodiment.

While the invention has been described with respect to two preferred embodiments, it will be appreciated that these are set forth for purposes of example only. Thus, the fertilizer could be a non-liquid material, such as a granular material. Many other variations, modifications and applications of the invention will be apparent.

What is claimed is:

1. A pump for injecting fertilizer or other material into a pressurized water supply line, comprising:
    an impeller connectable in parallel across said pressurized water supply line and including a housing having an inlet connectable to said pressurized water supply line, and outlet vented to the atmosphere so as to be at substantially atmospheric pressure, and impeller vanes rotatably mounted within the housing to be rotated by the pressurized water flowing therethrough from its inlet directly to the atmosphere via its outlet;
    and an injector including an inlet connectable to a source of the material to be injected, an outlet connectable to the water supply line at a point downstream of the impeller, and a coupling to the impeller vanes coupling same to the injector to inject the material into the water supply line at the downstream point at a greater pressure than that of the water thereat.

2. The pump according to claim 1, further including a control valve connected to the inlet of said impeller housing for controlling the rate of water flow therethrough, and thereby the rate of injection of said liquid material into said water supply line.

3. The pump according to claim 1, further including a control valve in the inlet of said injector for controlling the rate of flow of the material therethrough, and thereby the rate of injection of said material into said water supply line.

4. The pump according to claim 1, further including a check valve at the outlet side of said injector for preventing the reverse flow of water from said water supply line to said injector.

5. The pump according to claim 1, wherein the source of material to be injected includes an open-top container, the material being gravity-fed therefrom to the injector.

6. The pump according to claim 1, wherein the source of material to be injected includes a closed-top container, the material being gravity-fed therefrom to the injector.

7. The pump according to claim 1, wherein said injector comprises a screw feeder rotated by said impeller vanes.

8. The pump according to claim 7, wherein said screw feeder is coupled to said impeller vanes by a common rotary drive shaft.

9. The pump according to claim 1, wherein said injector comprises a second impeller rotated by the impeller vanes of said first-mentioned impeller.

10. The pump according to claim 9, wherein said second impeller includes impeller vanes of smaller diameter than those of said first-mentioned impeller.

11. The pump according to claim 10, wherein the impeller vanes of said second impeller are coupled to the impeller vanes of said first-mentioned impeller by a common rotary drive shaft.

12. A pump for injecting fertilizer or other material into a pressurized water supply line, comprising:
an impeller connectable in parallel across said pressurized water supply line and including a housing having an inlet connectable to said pressurized water supply line, an outlet vented to the atmosphere so as to be at substantially atmospheric pressure, and impeller vanes rotatably mounted within the housing to be rotated by the pressurized water flowing therethrough from its inlet directly to the atmosphere via its outlet;
and a screw feeder including an inlet connectable to a source of the material to be injected, an outlet connectable to said water supply line at a point downstream of said impeller, and means coupling said impeller vanes to said screw feeder to inject said material into said water supply line at said downstream point at a greater pressure than that of the water thereat.

13. A pump according to claim 12, further including a control valve connected to the inlet of said impeller housing for controlling the rate of water flow therethrough, and thereby the rate of injection of said material into said water supply line.

14. The pump according to claim 12, further including a control valve in the inlet of said screw feeder for controlling the rate of flow of the material therethrough, and thereby the rate of injection of the material into the water supply line.

15. A pump for injecting fertilizer or other material into a pressurized water supply line, comprising:
a first impeller connectable in parallel across said pressurized water supply line and including a housing having an inlet connectable to said pressurized water supply line, an outlet vented to the atmosphere so as to be at substantially atmospheric pressure, and impeller vanes rotatably mounted within the housing to be rotated by the pressurized water flowing therethrough from its inlet directly to the atmosphere via its outlet;
and a second impeller including an inlet connectable to a source of the material to be injected, an outlet connectable to the water supply line at a point downstream of said first impeller, and a coupling to the impeller vanes of said first impeller coupling same to said second impeller to inject the material into the water supply line at said downstream point at a greater pressure than that of the water thereat.

16. The pump according to claim 15, further including a control valve connected to the inlet of said first impeller housing for controlling the rate of water flow therethrough, and thereby the rate of injection of said liquid material into said water supply line.

17. The pump according to claim 15, further including a control valve in the inlet of said second impeller for controlling the rate of flow of the matrial therethrough, and thereby the rate of injection of said material into said water supply line.

18. The pump according to claim 15, further including a check valve at the outlet side of said second impeller for preventing the reverse flow of water from said water supply line to said second impeller.

19. The pump according to claim 15, wherein said second impeller includes impeller vanes of smaller diameter than those of said first impeller.

20. The pump according to claim 19, wherein the impeller vanes of said second impeller are coupled to the impeller vanes of said first impeller by a common rotary drive shaft.

* * * * *